United States Patent Office 3,460,434
Patented Aug. 12, 1969

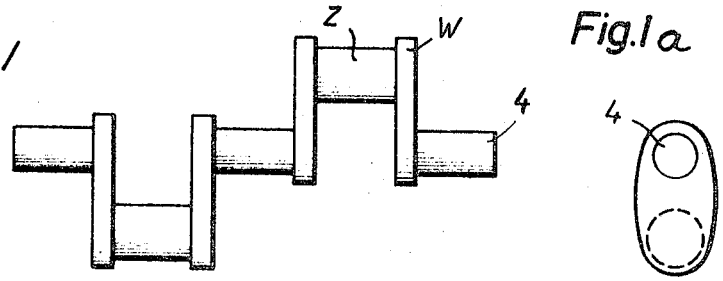
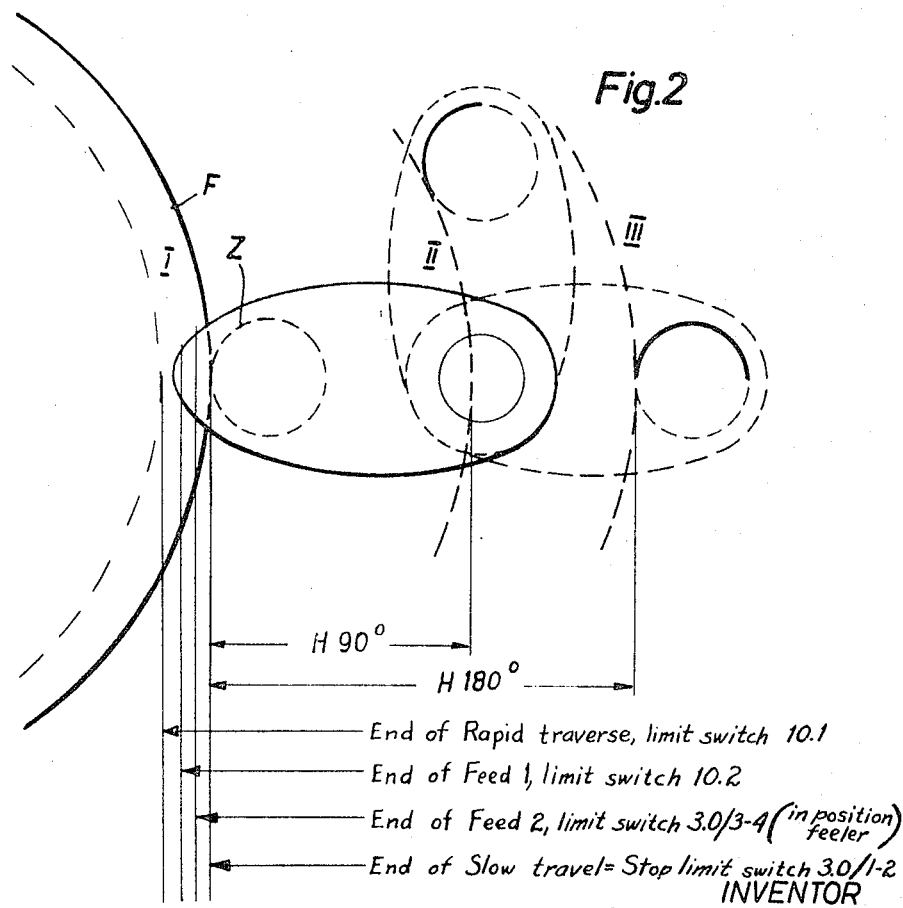

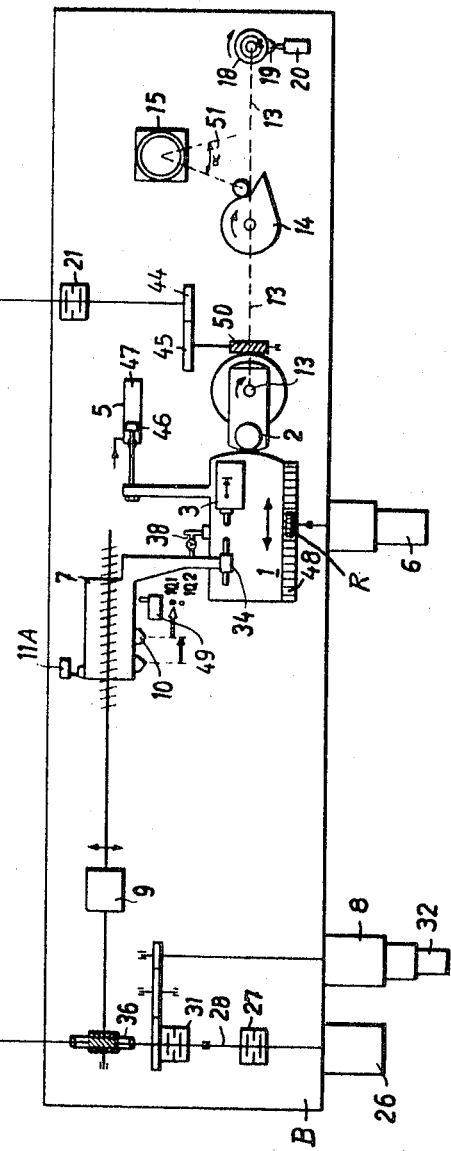

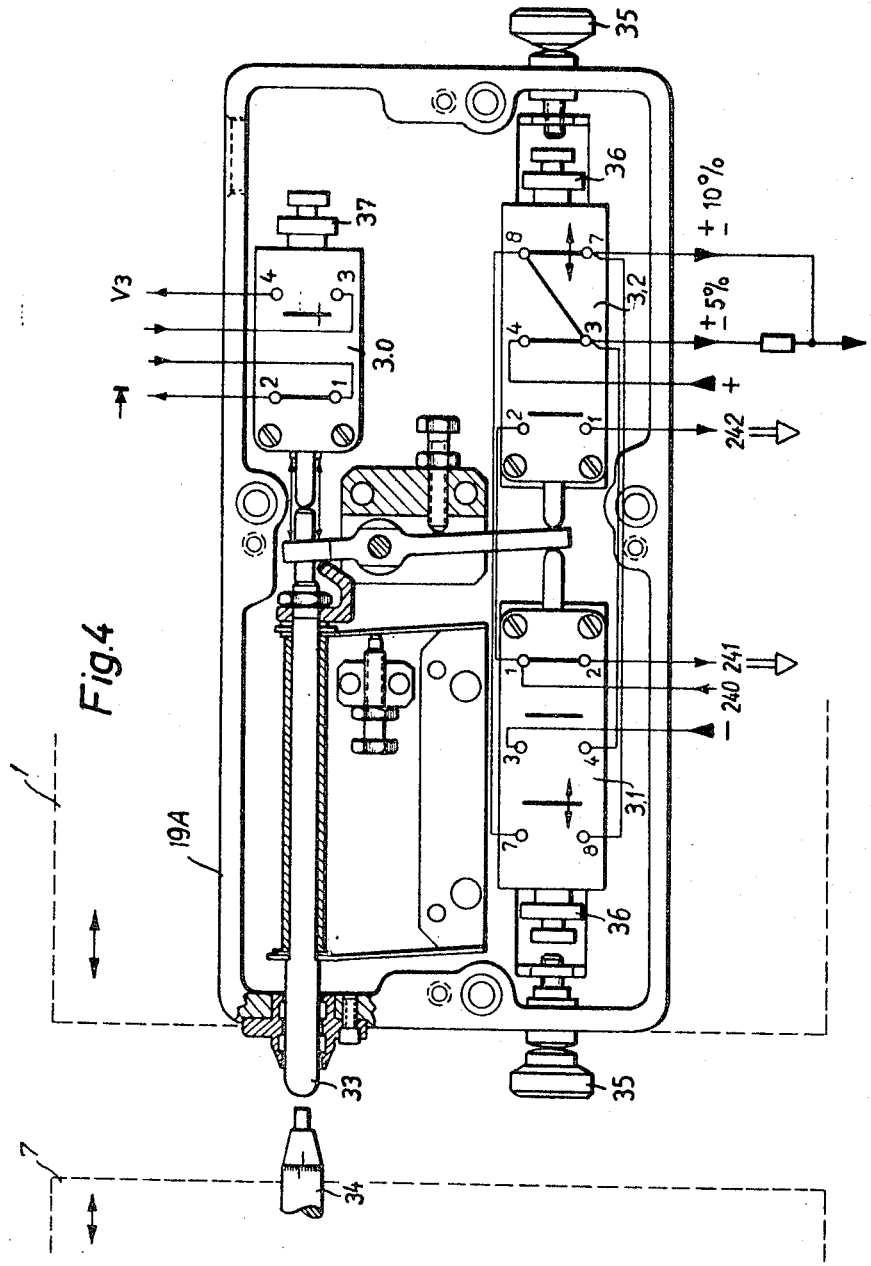

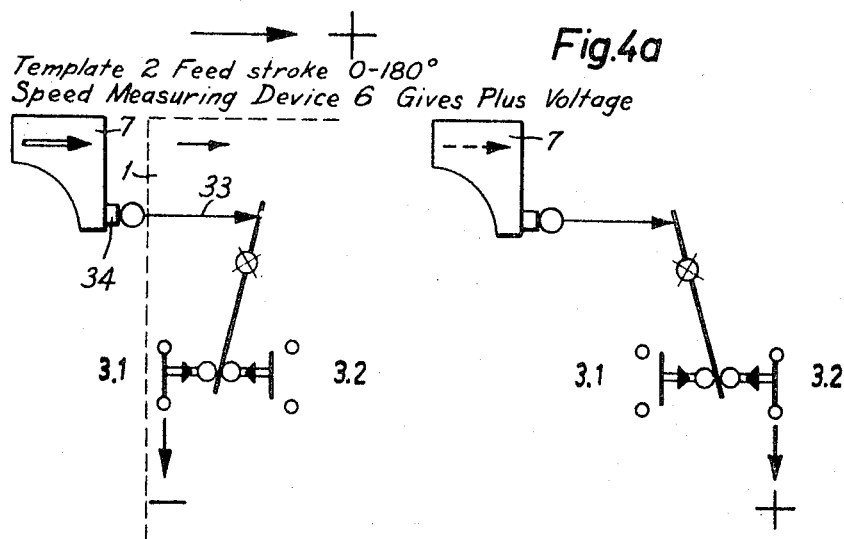
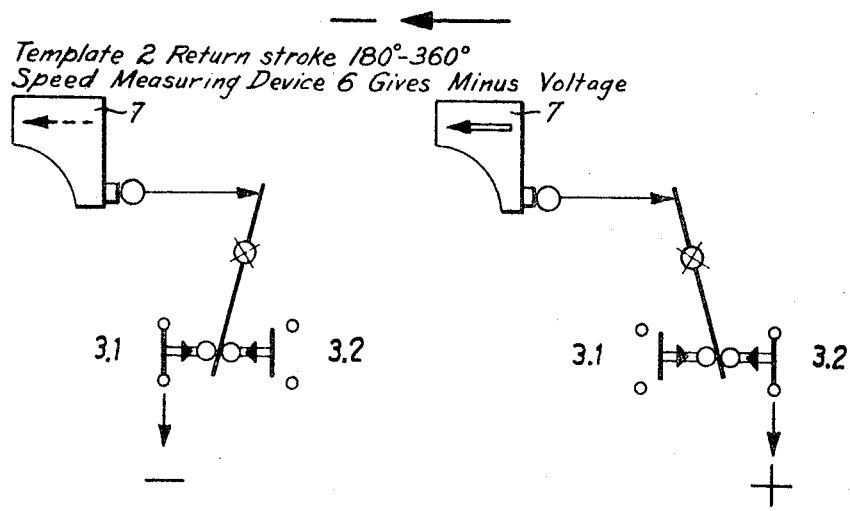

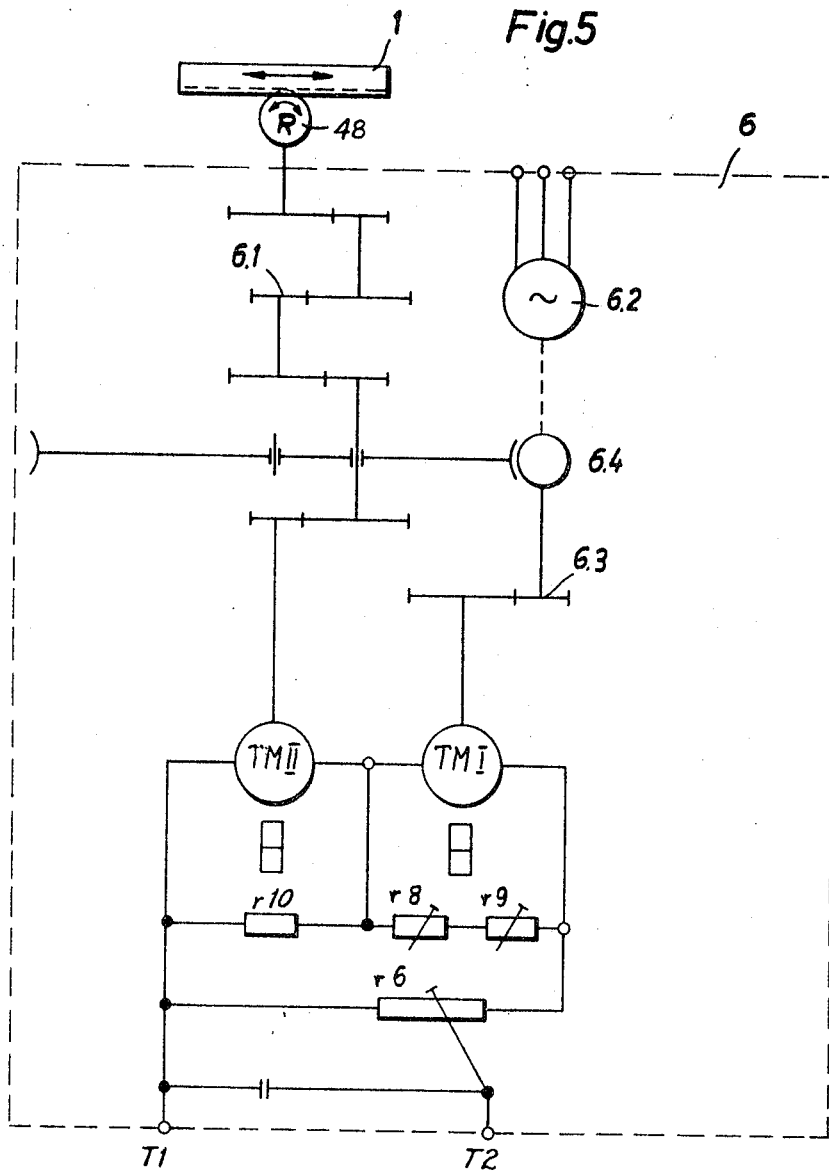

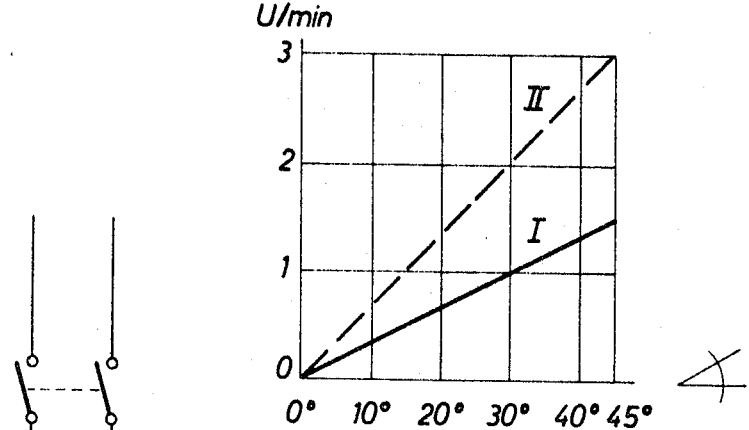
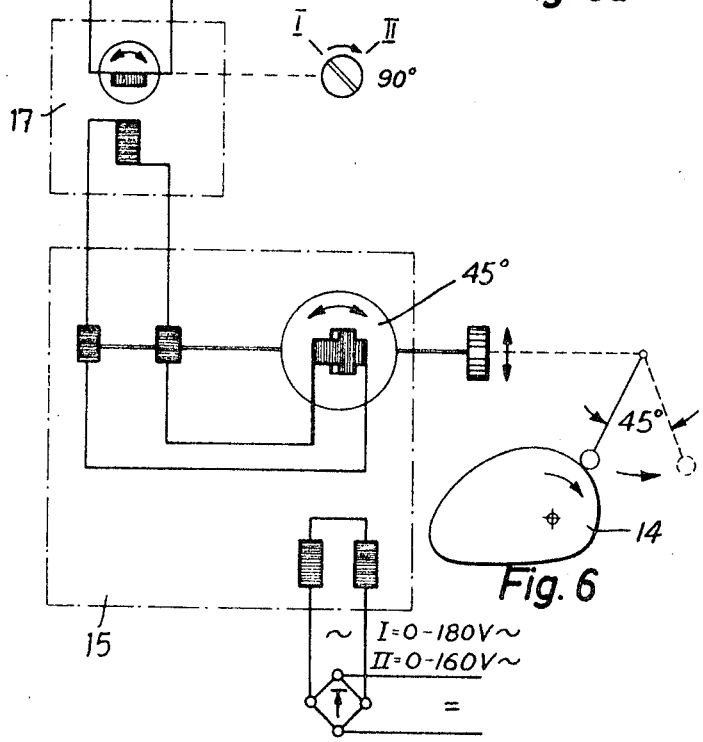
Fig. 6a
Fig. 6

3,460,434
FULLY AUTOMATIC ELECTRIC CONTROL FOR
CHIP-REMOVING MACHINE TOOLS
Kurt Maecker, Kreuzstr. 34, Dusseldorf, Germany
Filed Sept. 15, 1966, Ser. No. 579,593
Claims priority, application Germany, Sept. 16, 1965,
M 66,654
Int. Cl. B23c 1/18
U.S. Cl. 90—13.4     27 Claims

ABSTRACT OF THE DISCLOSURE

An electric control system for a templet controlled machine tool in which a work piece spindle supports and rotates a work piece while a templet on a templet spindle is rotated in unison with the work piece. A single adjustable speed electric motor drives the said spindles.

A tool carriage carrying a tool for operating the work piece is driven together with a templet follower carriage by a fast traverse electric motor and an adjustable speed electric feed motor. The carriages are driven rapidly toward and away from the work by the fast traverse motor and as the tool approaches the work piece, the drive shifts to the feed motor. While the feed motor drives the carriages, the speed of the templet carriage is detected and the speed of the feed motor is adjusted to hold the detected speed substantially constant.

The speed of the spindle drive motor is adjusted by a cam in conformity with the angular rotation of the spindles.

---

The present invention relates to a fully automatic electric control for chip-removing machine tools adapted to operate according to the copying method, and, more specifically, concerns such machines of this type in which the copying control is effected along one coordinate only.

With machines of this type, the copying problem is considerably more difficult to solve than is the case with machines in which two coordinates can be effected as is the practice with most machine tools of the general type involved. With machine tools operating according to two coordinates, the most favorable resultant of the feed speed can be selected which means the faster the movement in one direction, the lower will be the movement in the other direction.

As an example for such machines in which the control is effected along one coordinate only, there will in the following be selected a crankshaft milling machine which offers particular difficulties in view of the considerable size of the work piece. In this connection, it should be obvious that the bigger the work piece, the wider and heavier will have to be the milling carriage and templet and the higher will be the required cutting pressure. Moreover, the templet will have to be arranged below the milling carriage which means it will be difficult to reach. Furthermore, particularly with big work pieces which are produced in relatively low numbers only, it is necessary to exchange the templet more frequently whereby considerable time for non-productive work is to be wasted.

With a crankshaft milling machine, it is necessary to mill out from the shaft the shaft journal and the jaws while the work piece is centrically chucked. For carrying out the milling operation, the crankshaft is rotated, and the milling carriage with the miller has to follow the work piece.

The speed for the rotation of the work piece depends on the required cutting speed, the permissible cutting pressure and the quantity of the material to be machined off. The speed of the work piece is not controlled by the copying control. The copying control can be effected only during the advancing feed of the carriage. However, the feed speed should be increasable while maintaining the close tolerances, the roundness, and the precision of the shaft journal or pivot.

It should furthermore be taken into consideration, that the milling operation is accompanied by considerable vibrations inasmuch as the machining is possible only with a cutter head.

It is, therefore, an object of the present invention to provide a fully automatically controlled machine tool with copying control, which will overcome the above outlined difficulties.

It is also an object of this invention to provide a machine tool of the above mentioned type which will operate at extremely high precision also during the advancing feed and also with rather big work pieces operating with considerable masses, high static loads and high time delays.

Suggestions to solve these problems could not be gathered from heretofore known hydraulic or electrohydraulic copying devices. Heretofore known devices of the just mentioned type comprise two or three point controls, the so-called bearing controls which are controlled by the templet and in case of deviation from the central position in one or the other direction by one or more contacts or also without contact control the turning on and off and the direction of rotation of the drives with one or two coordinates in the manner of a follower control device.

A system of this type cannot be adopted for a machine according to the present invention, because with the here desired high advancing feed of from 10 millimeters per second, a very high impulse number, more than 50 impulses per second would be required while always the highest feed speed would have to be controlled. This would result in a very unsteady feed-follower control.

According to another heretofore known system, a feeler is employed which in conformity with the templet brings about the emission of a signal for the magnitude of the speed which signal corresponds to the magnitude of the movement of the feeler. In this instance, always two coordinates are effected in such a way that when the speed is reduced along one coordinate, the speed is increased along the other coordinate.

Also this known system is not applicable to machines of the present invention because with the narrow tolerance of $+0.025$ millimeter, already at 0.025 millimeter it would be necessary continuously to increase the full speed range, for instance from 0 to 10 millimeters per second. This would be possible only by means of a high mechanical transmission ratio between templet carriage and feeler with corresponding mechanical transmission errors or with a very high electric amplification which latter would make the control over-sensitive and cause oscillations.

The precision required with the present invention could not be obtained with heretofore known systems with work pieces having large masses, a high inertia and static loads inherent thereto and with the great time delays likewise inherent thereto.

The objects and advantages of the present invention will appear more clearly from the following specification in connection with the accompanying drawings, in which:

FIG. 1 diagrammatically illustrates a side view of a crankshaft.

FIG. 1a is an end view of the crankshaft of FIG. 1.

FIG. 2 diagrammatically illustrates the stroke to be performed by the miller in order to follow the work piece during the milling of a crank pin.

FIG. 3 diagrammatically illustrates the entire mechanical drive and the mechanical portion of the follower control including the copying control device.

FIG. 4 illustrates the feeler in section and on a larger scale than the preceding figures.

FIGS. 4a and 4b diagrammatically illustrate the control operations in this device.

FIG. 5 diagrammatically illustrates a speed measuring device.

FIG. 6 is a rotating field emitter for controlling the speed of the work piece spindle motor.

FIG. 6a illustrates the control curves pertaining to the arrangement of FIG. 6.

Figure 4B:
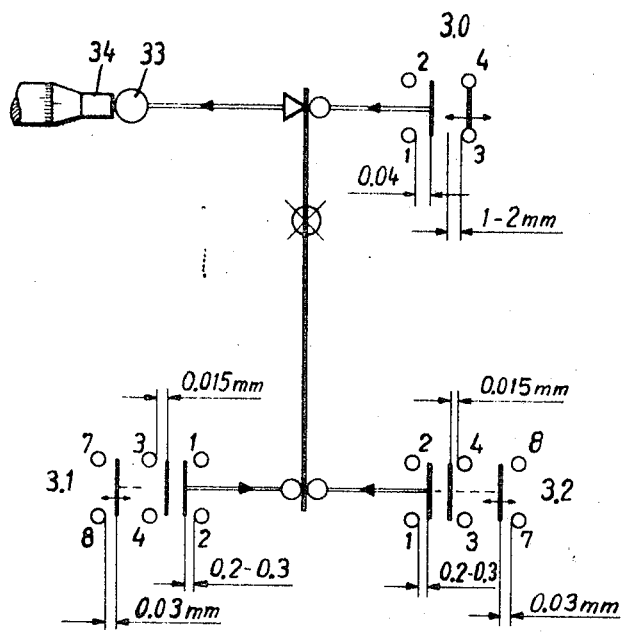

The objects according to the present invention have been realized with the present invention by the provision of two copying control systems which are independent of each other. These two copying control systems respectively comprise a direct speed measurement of the templet movement in connection with the ascertainment of the direction of movement over the entire stroke, for instance a speed measuring device which determines the feed speed and the direction of movement for the drive of the tool carriage and furthermore brings about a stroke control with follower control without affecting the direction of movement for instance a location feeler which emits signals for the correction of the speed.

The device according to the present invention avoids the drawback of high impulse numbers. The control is uniform and quiet and works with a maximum of precision even though one coordinate only is effected.

The precision obtained by a direct speed measurement alone would not meet the requirements which have to be met by a machine according to the invention. This is due to the fact that very high feed speeds prevail, and furthermore there must exist the possibility to control down to a speed of 0, for instance at the reversing points 0° and 180° when milling the crank pin of a crankshaft, and at the reversing points 0.125°, 180°, 235° and 360° when milling the crank webs. In both instances, due to the rotation of the work piece a speed curve is obtained over the working angles which has to be followed by the milling carriage. At low speeds, the speed measuring device as well as the driving motor of the milling carriage itself loses its linearity of voltage and speed, and when a direct current variable speed motor is involved it begins to move in a jerky manner.

There occurs the further difficulty that when reversing the direction of feed, also when milling the crank pin at the 180° position and with the crank pin at the above mentioned four positions, the so-called reversing period, i.e., the mechanical forces in the entire drive have to be compensated for. It should be noted that while the templet and thus the templet carriage move and the speed signal is produced, the milling carriage does not yet move because during the reversal, first the drive in one direction has to be relieved in one direction and has to be established in the other direction. These drawbacks have all been overcome by the provision of the position control which is independent of the direct speed.

When the templet moves faster than the milling carriage, the position measuring device will emit an additional control signal which will bring about an acceleration of the milling carriage, or when the milling carriage moves too fast will slow down the same accordingly. The copying control according to the present invention thus is a follower control in which in view of the control of the speed approximately the respective required magnitude, only additional correcting operations are to be carried out. As a result thereof, the control frequency of the follower control device is considerably less than with an exclusive position control. Experience has shown that these additional controls are less than ten per second.

According to a particularly advantageous embodiment of the present invention, a templet carriage is by an independent force pressed against the driven templet which moves in the same direction as the work piece. The said templet carriage drives a speed measuring device for conveying the feed speed and the direction of movement to the feed control motor for driving the milling carriage or carriages. This motor drives a control carriage carrying a position follower control which includes a templet follower. The follower, or position feeler arranged on the templet carriage controls the supply of signals for the correction of the speed of the feed motor.

This arrangement has the advantage that in contrast to heretofore known machines with hydraulic copying devices, it is not necessary to arrange the templet below the milling carriage but the templet can be arranged at any desired location of the machine. At any rate, the templet moves with the same speed of rotation as the work piece. In order to assure this, the templet is advantageously directly driven by the work piece drive.

The templet carriage according to the invention follows the movement of the templet, which means it thus converts the circumferential speed of the templet into a corresponding feed speed of the templet carriage. If, for instance, the smallest crank pin stroke amounts to 50 millimeters, then the total feed stroke carried out during the forward and rearward movement will be 200 millimeters. Over this stroke, according to a further development of the present invention, the templet carriage through the intervention of a rack or a ball spindle will at a stepup transmission ratio drive a tacho-machine or a digital speed measuring device which indicates the speed and the direction of movement for the feed drive of the milling carriage or carriages.

The position control which is independent of the direct speed measurement comprises a three-point feeler mounted on the templet carriage, in cooperation with a special control carriage driven by the same feed motor as the milling carriage or carriages.

Thus, a control member in the form of a control carriage is operatively connected to the templet carriage and moves with the same speed as the templet carriage. When the templet carriage moves faster than the control carriage, the position measuring device has to emit into the control circuit an additional control signal for accelerating the control carriage and vice versa for its speed reduction when the control carriage moves too fast.

When the feed speed is rather high, it may be advantageous according to a further development of the invention to feed these additional signals in a stepwise manner or, if desired, also in a continuously varying manner.

According to a still further development of the invention, between the templet and control carriage there may be arranged a device which will make it possible during the milling operation optically to ascertain to what extent the control carriage moves away from or toward the templet carriage. This device may, for instance, consist in a measuring clock.

According to a further feature of the present invention, a further signal is emitted when a predetermined tolerance is exceeded. This further signal brings about a return of the milling carriage to its basic position in order to prevent damage to the work piece.

According to a further development of the invention, the arrangement of a transmission stepdown in the drive of the control carriage, a reduction in the speed of the control carriage and thus a reduction in the stroke is obtained whereby it is possible to reduce the templet at the same ratio, said templet, however, retaining its speed of rotation.

This arrangement makes it possible also with very big machines having a stroke for instance of 500 millimeters in which the templet would be rather expensive, to correspondingly reduce the speed of the control carriage and thereby the stroke. With the above mentioned embodiment, the diameter of the templet movement which amounts to twice the stroke plus pin diameter will be in excess of 1,000 millimeters. Inasmuch as the speed of the control carriage is reduced in conformity with the transmission ratio, and since the speed of the templet carriage is lower than that of the work piece in view of the speed at the same ratio smaller templet, the feeler can work with higher precision so that in spite of the reduction practically the same control precision can be obtained. Similar considerations also apply to the speed measuring device which, if it concerns an electric measuring device, can without difficulties be so adjusted that the furnished voltage will always correspond to the actually required speed of the milling carriage.

According to a particularly advantageous construction of the device according to the invention, the recessing movement of the milling carriage can be controlled as to speed by the control carriage by cams and signal emitters. By recessing movement is meant the movement of the milling carriage which occurs prior to the copying milling, in other words, the movement which moves the carriage to its starting position, for copying-milling. This copying control starting position requires particularly high precision inasmuch as the tolerance is ±0.02 millimeter. In order to be able to obtain this precision, the speed is prior to stopping reduced in a manner known per se so that the tool will so to speak creep to the work piece. This creeping movement should be below 10 millimeters per minute.

At said copying control starting position, the three-point feeler must occupy its central position. In order to simplify the setting of the machine, it is provided according to the present invention that the shifting over to the creeping movement and the stopping of the recessing movement is carried out likewise by signal emitters in the three-point feeler.

In this way, there will additionally be obtained the advantage that the three-point feeler simultaneously with the stopping of the recessing movement will automatically occupy its starting position because the stopping point in the three-point feeler for the command recessing is positively connected to this starting position for the copying control. Also the signal for the end of the return stroke of the milling carriage may according to a further development of the invention be mounted on the control carriage so that all control elements for the longitudinal movement of the milling carriage or carriages (without copying) are combined on the control carriage.

In order to prevent the vibrations on the milling carriage from becoming too strong in view of the milling operation, whereby the measurements would be unfavorably influenced or could even be made impossible, the present invention provides that the control carriage with the templet carriage, the templet, and the feed drive form a structural unit which as an entirety can be separately mounted on the machine.

In addition to the advantage that the vibrations conveyed to the milling carriage cannot be transmitted to the feed and control unit, the compacting of the entire control at one area has great advantages from the operating and control standpoints because the setting can be effected from one spot. Moreover, the operation of the machine can likewise be controlled from one spot.

The outstanding advantage of this compact arrangement of the control unit consists in that this unit can be employed for an entire series of machines, because the magnitude of the feed drive does not grow with the size of the machine but primarily only the output of the milling drive grows. For static reasons, the transmission of the feed is so designed that also large machines can be driven thereby. The same building unit can be employed for machines having a stroke of, for instance, from 50 to 500 millimeters.

Inasmuch as in each instance the templet must have the same speed as the work piece, the templet is advantageously driven directly by the work piece drive.

According to a further embodiment of the invention, the drive for the templet which is coupled to the drive for the work piece is included in the control unit.

According to a further feature of the invention, the shaft carrying the templet for the work piece spindle and being automatically connected to the work piece spindle drive by means of a mechanical or electrical synchronous drive may at the same time be employed for controlling the speed of the work piece spindle. Since, as mentioned above, these speeds are ascertained by calculation and are not influenced by the copying control, it is possible to mount a special speed templet on said shaft which templet through the intervention of a signal emitter, which may be an analogous or digital signalling device, prescribes a speed to the work piece-spindle drive which speed corresponds to the angular position.

If desired, according to the present invention, the said speed signal emitter may be supplemented by a device which will place the total level of all speeds percentagewise higher or lower. With rotating field emitters, this is realized by increasing or decreasing the energization of the rotary field emitter by means of a preceding adjustable transformer or converter. In this way, it is possible in spite of the fixed speed templet, to adapt the work piece spindle drive to the material and the miller.

According to a further embodiment of the invention, the shaft for the templet drive has mounted thereon a disc with a cam which latter in cooperation with a precision end feeler determines the location of the work piece, and releases the recessing movement only when the work piece has occupied this position. In this way, it will be assured that at the start of the recessing movement, the work piece will always occupy a certain position which means will be in its starting position.

If it is desired for the next crank pin to be milled, prior to the recessing movement to turn the work piece into another angular position without changing the templet drive, in other words, when an indexing is to be effected, it is provided according to the present invention that the drive of the templet shaft is separated from the work piece spindle drive by disengaging a clutch. Mounted on the shaft of the work piece spindle mounting is a special indexing device. This indexing device may consist of adjustable cams acting upon end feelers and thus influencing the work piece spindle drive. The angle measurement and pre-selection of the other angular positions may be effected also by a digital measuring device.

When exchanging the work piece for another form and size, it is thus merely necessary to exchange the two templets as far as the feed and work piece spindle speeds are involved.

Referring now to the drawings in detail, FIG. 1 shows the work piece 4 with a crank pin Z and a crank web W. FIG. 2 shows how during the rotation of the work piece the crank pin to be milled moves into different positions while the miller F follows the work piece. The miller F is diagrammatically indicated as a circular line which in the first position I engages the crank pin. After a rotation by 90° (illustrated by a dash line), the crank pin and the miller F occupy the position II while the full circular line of the crank pin indicates to what extent the latter has been machined in this position. Position III shows the machining which has been effected after a rotation of 180°, and it will be seen by the full line of the crank pin that in this position a total of 180° has been machined.

FIG. 3 again shows the work piece 4 which has been centrically chucked while a milling carriage 12 with the miller F is in front of said work piece. If desired, also a second milling carriage may be provided which is not shown in FIG. 3. Work piece 4 is driven through the intervention of a worm drive 30, a pair of spur gears 40, 41, a pair of bevel gears 42, 43 and a further transmission which is drivingly connected to the work piece spindle drive motor 16. The templet 2 is driven through the intervention of shaft 11, clutch 21, the gear pair 44, 45, and worm drive 50 drivingly connected to the work piece spindle drive motor 16 at the same speed as the work piece 4. The templet carriage 1 is by means of an independent force 5, in the present instance a hydraulic piston 46 in cylinder 47, pressed against the templet 2 while the circumferential speed of the templet 2 is converted into a corresponding feeding speed for the templet carriage 1. This is done by a device 6 driven by the templet carriage which supplies current to a feed drive motor 8.

Templet carriage 1 drives the speed measuring device 6, an electric tachometer, for example, through a rack 48 and pinion R and, more specifically, over the entire advance and return movement of the templet carriage, said feeding stroke amounting to 200 millimeters at a stroke of 50 millimeters. Mounted on the templet carriage 1 is a three-point feeler 3 and adjacent thereto is arranged the control carriage 7. The control carriage 7 is driven via step down transmission 9 and worm drive 36 by shaft 28 which, in turn is driven by one of motors 8 or 26. Shaft 28 also drives the milling carriage 12 via worm drive 29. The control carriage 7 thus follows the templet carriage 1, and is driven in the same direction as the milling carriage 12. Control carriage 7 carries a dog 10 adapted to act upon a limit switch box 49. The fast advance movement, effected by motor 26 via clutch 27, is adapted to be turned off and clutch 27 opened by the limit switch 10.1 which at the same time shifts over to feed and, more specifically, to the feed speed $v_1$. Feed speed is by motor 8 via clutch 31. By means of the limit switch 10.2, the switch-over to feed speed $v_2$ is effected. Motor 8 runs at a higher speed for feed speed $v_1$ and at a lower speed for feed speed $v_2$. The two feed speeds $v_1$ and $v_2$ may be adjusted at random by potentiometers. The fast speed motor 26 through clutch 27, shaft 28 and worm drive 29, drives the miller carriage 12 at a substantially constant high speed. The feed speeds are effected by the direct current variable speed motor 8 and clutch 31. Each clutch 27, 31 is engaged only when its respective motor 26, 8 is driving.

Miller F is driven by a three-phase motor 33 through the intervention of a worm drive. Miller F continues operation until a crankshaft has been finish-machined. Shaft 13 on which templet 2 is mounted has arranged thereon a disc 18 with a cam 19 serving for the precise basic position of the work piece spindle and cooperating with the limit switch 20.

The control of the speed of the work piece spindle motor 16 is effected by means of a contact-less rotary field emitter 15 (rotary transformer or resolver, for example) (FIGURE 6) which is controlled by a cam 14 mounted on control shaft 13 which rotates at the same speed as the work piece spindle since it is driven by the same motor 16. Angular movement of control cam 14 results in variation of the voltage supplied by component 15 and this voltage is supplied to motor 16 to produce a certain work piece spindle speed (FIGURE 6a). The voltage supplied by component 15 can be further controlled by the preceding rotary transformers or converters 17. This is necessary in order to be able to vary the speed determined by the cam 14 in its entirety in upward or downward direction, and, more specifically, within the range of the two curves I and II (FIG. 6a), curve I illustrating 50% of the output and curve II illustrating 100% of the output of the rotary field emitter 15. Cam disc 18 on shaft 13 serves for precisely locating the starting position of the work piece spindle for the start of the working operation. At the start of the milling operation, the crank pin to be milled must occupy a position horizontal with regard to miller F. This starting position is imperative for the initial advancing movement of the milling carriage 12 as well as for the start of the copying operation. The limit switch 20 therefore locks the advance of the miller if it is not actuated. At the same time, switch 20 also serves for turning off the copying operation at the end of the copying stroke, i.e. precisely after a rotation of the crank pin by 360°. At this point, the fast return movement of the milling carriage to its starting position is effected.

The copying device operates as follows. The limit switches 10.1 and 10.2 serve for dimensioning the fast traverse strokes and the feeding strokes. The end of the feed and thus the start of the copying control is obtained through the intervention of the three-point feeler 3. This feeler is mounted on the templet carriage 1 which is firmly pressed against the feed templet 2 arranged on shaft 13 whereby said templet 2, together with the work piece-spindle, performs one revolution during the milling operation of a crank pin or a crank web.

In feeler 3 (FIG. 4) there is provided the limit switch 3.0 which through the intervention of contacts 3, 4 shifts the feed motor 8 to creeping operation and then stops said feed motor 8 by means of contacts 1, 2. At this time, the feeler 3 will occupy its intermediate position for the copying control when the advance has been completed, in other words, when the control carriage 7 has moved feeler 3 to its intermediate position, the work piece spindle 4 starts rotating, and the templet carriage 1 follows the feed templet 2. Templet carriage 1, through the intervention of a rack 48 and pinion R, drives the speed determining device 6 which latter impresses upon the feed motor 8 through an electronic control a voltage which will cause the corresponding speed and direction of movement. Through tacho-machine 32 on feed motor 8, the actual speed of motor 8 as a voltage is measured and is compared with the voltage developed by device 6. If due to mechanical and electrical tolerances differences in the stroke occur between carriages 1 and 7, these are indicated by the feeler 3 through switches 3, 1 and 3, 2 (FIG. 4) which in such an instance will cause additional voltages in the control voltage supplied to motor 8 as indicated diagrammatically in FIG. 4a. During one revolution of templet 2 during which the templet carriage 1 moves forward and backward, the control carriage 7 must not leave the central position of the feeler 3 by a distance exceeding the admissible tolerance, the corresponding tolerance strokes being preadjusted in conformity with FIG. 4b.

After one revolution of the templet 2, i.e. after the copying operation has been completed, by means of the fast traverse motor 26 and clutch 27, the control carriage 7 and milling carriage 12 are rapidly returned until the limit switch 11A connected to control motor 26 is actuated to limit the said return movement. This limit switch may be mounted adjacent either the control carriage 7 or the milling carriage 12, as shown. For purposes of measuring the speed of carriage 1, a precision pinion R is driven by rods 48, the pitch circle diameter of the pinion being selected to be 31.85 millimeters so that 100 millimeters of each movement will produce for one revolution of the pinion. For the feed of 600 millimeters per minute, the pinion will perform a maximum of ±6 r.p.m. Inasmuch as the tacho-machines heretofore marketed require high speeds, according to the present invention, a stepup transmission ratio of 6.1 (FIG. 5) has been provided which may for instance be a transmission ratio of 1:45. In view of the speed measuring device according to the invention, at the same time the drawback has been overcome that ordinary tacho-machines will at speeds of below 20 r.p.m. not furnish any linear voltages. The measuring device according to the invention has been diagrammatically illustrated in FIG. 5.

According to FIG. 5, through a synchronous motor 6.2 and a corresponding transmission 6.3, a tachometer machine TMI and at the same time a second tachometer machine TMII is driven through a worm and planetary gear transmission 6.4. Both tacho-machines operate at slightly different speeds, in the preceding instance TMI operating at $n=345$ and TMII operating at $n=318$. The voltages of these tacho-machines are arranged in series with each other, and by means of the adjustable resistors $r8$ and $r9$ are so equalized that at the output terminals $T_1$ and $T_2$ the voltage 0 will prevail when the pinion R is at a standstill. When pinion R rotates, the speed of TMII is changed and the voltage across terminals $T_1$ and $T_2$ either goes positive or negative, depending on the direction of motion of pinion R.

Figure 5A:
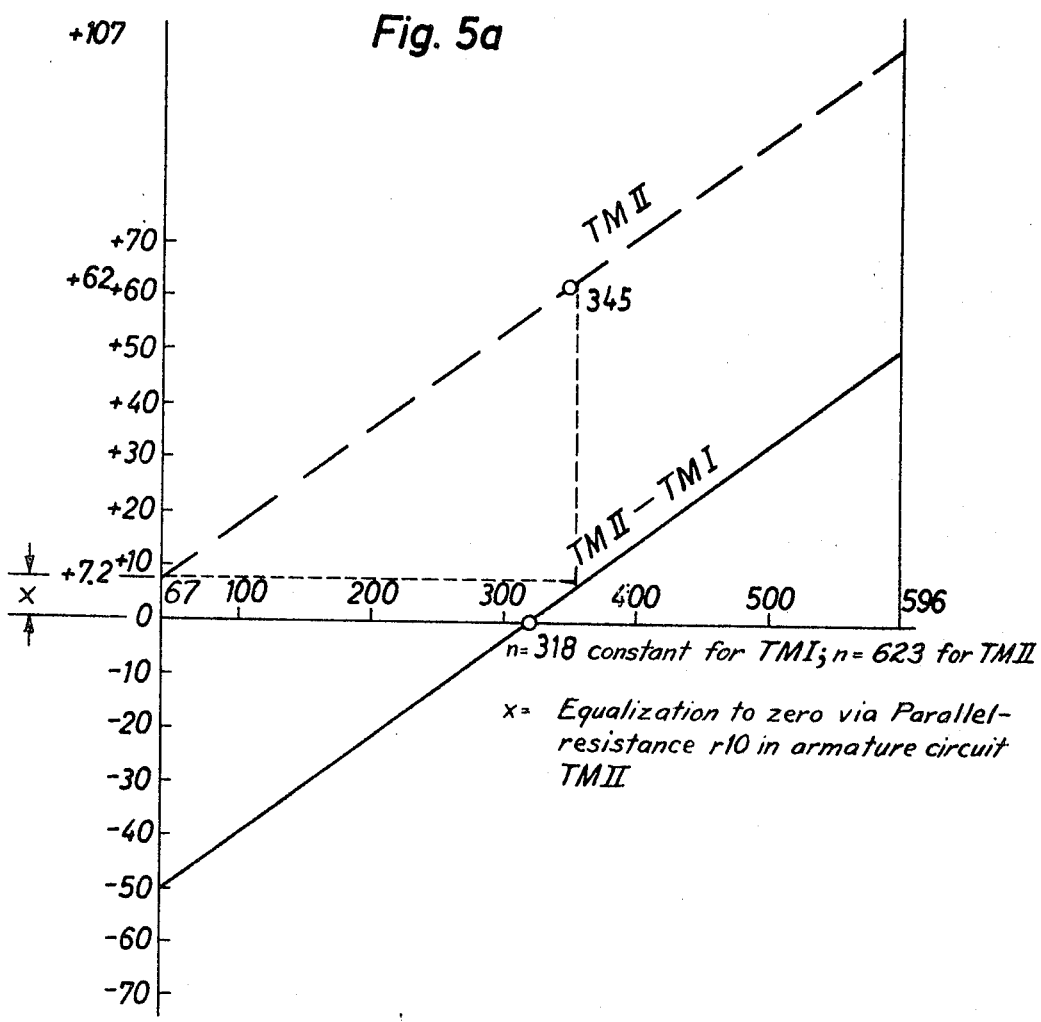
FIG. 5a shows the characteristics pertaining to the device of FIG. 5.

If now by means of templet 2 and control carriage 7, the pinion R is turned in leftward or rightward direction, the speed of the tacho-machine TMII will be increased or reduced, and, more specifically, down to the speed $n=40$ or up to the speed of $n=596$. As a result thereof, at the output terminals, while considering the counter voltage of the tachometer machine TMI, a voltage of ±50 volts is obtained which is absolutely linear with respect to the speed of pinion R. The characteristics are shown in FIG. 5a. In FIGURE 5a, the voltage of TMI is constant and the varying voltage of TMII is shown by the dashed line. The voltage difference which appears across terminals $T_1$ and $T_2$ is shown by the solid line which passes through zero when the speed of TMII equals 318 r.p.m.

In view of the speed measuring device according to the invention, certain other advantages are obtained which have a favorable influence upon the setting of the copying operation. In this connection, it should be mentioned the 0 point adjustment and also a checking of the voltage during the copying operation, which voltage should as far as possible precisely correspond to the voltage required for the base speed.

When the control has been set for copying, while the templet is still at a standstill, which means that no minor rotation of the work piece occurs, the feed motor 8 has likewise to be at a standstill. In view of differences in the succeeding controls, amplifiers, generator fields, etc., it is still possible that the feed motor 8 rotates although the rated value is zero. When the feed motor 8 should thus turn, a correction in the equalizing resistors of the speed measuring device can be effected.

According to a particular embodiment of the invention, that is effected by a coarse adjustment on resistor $r9$ (FIG. 5) and a fine adjustment on resistor $r8$ in such a manner that during the forward start of the templet carriage 1, already a slight ± voltage is furnished until the feed motor 8 actually stands still. Only a slight movement of the templet carriage 1 in forward or backward direction will allow the feed motor to rotate in left and right-hand direction.

For purposes of controlling the voltages of the velocity meter, the control carriage 7 is advanced and shifts to copying.

By means of an indicator 38 a machinist's indicator having a needle sweeping a graduated dial, for example, disposed between carriages 1 and 7, the distance between the templet carriage and the control carriage 7 is measured and indicated. When during the advancing movement of said templet carriage this value changes, the velocity of carriage 7 is too high. If the distance between the templet and the control carriage is greater, then the velocity of carriage 7 is too low. The base fundamental velocity of carriage 7 can be adjusted at the voltage terminals of the speed measuring device at the output resistor $r6$.

When during the setting of the fundamental velocity of carriage 7 it has been ascertained that during the advance or return the uniform adjustment of the voltage is off, the control is not symmetric. This can be caused by mechanical factors such as different frictional resistances during the forward and return movements. However, unsymmetries may prevail in the control part or in the generator fields.

According to a particular embodiment of the invention, an unsymmetrical advancing and return movement can be compensated by adjustment of resistance $r8$ of the speed measuring device. These unsymmetrical settings can if they should be disturbing in the basic position of the copying, i.e. at the standstill, be made ineffective by opening and closing the corresponding contacts of the limit switch 20 (FIG. 3).

Feeler 3 which serves for compensating the possibly occurring stroke errors can be seen in FIG. 4 and is arranged on the templet carriage 1. The feeler 3 has a push rod 33 reciprocable in housing 19A, and which rod is actuated by the control carriage 7 and, more specifically, through the intervention of the mico-set screw 34. When templet carriage 1 and control carriages 7 operate uniformly within the permissible tolerances, the feeler will have no effect. If the control carriage moves too slowly or too fast, either the contact switch 3.1 or the switch 3.2 is actuated whereby a fixed additional control voltage is superimposed on the voltage supplied by unit 6 to adjust the speed of motor 8 in a compensating direction.

Feeler 3 furnishes the additional voltage in two stages inasmuch as the contacts 3, 4 of the switches shown close first and furnish 5% and the contacts 7, 8 which close later, furnish 10% of the control maximum voltage.

It is to be kept in mind that the speed measuring device 6 in advancing direction furnishes a plus direct voltage to motor 8 and in return direction furnishes a minus direct voltage to motor 8 and to which the additional voltage referred to is added or substracted whereby, however, the direction of movement of the drive is not affected but merely the speed of motor 8 is adjusted.

When the control carriage moves too fast (see upper left portion of FIG. 4a), the pushrod 33 would be further pressed against the abutment 34. First the contacts 3–4 of the left lower limit switch 3.1 close. This contact yields a minus voltage, for instance −5 volts, and conveys the same to the control circuit the plus voltage of which, i.e. the rated voltage of the velocity measuring device 6, amounts to for instance 30 volts. This control voltage drops by the minus voltage of −5 volts to 35 volts whereby also the speed of the motor 8 drops through the control circuit.

If this reduction in speed should be insufficient, the pushrod 33 is moved further toward the right. The contacts 7–8 close which now give off a still higher minus voltage, for instance −10 volts, to the control circuit the voltage of which is now reduced to 20 volts. Similarly, a correction is effected when for instance, the control carriage moves too slowly (see FIG. 4a upper right-hand portion). First the contacts 3–4 of the right-hand limit switch 3.2 close. These contacts, however, now give off a plus voltage, for instance +5 volts, so that the rated voltage will increase by this amount and thereby also the speed of motor 8.

The two lower parts of FIG. 4a show the effect of the limit switches 3.1 and 3.2 during the return of the templet 2 (180 to 360°). The direction of rotation of the velocity measuring device 6 has likewise been reversed and gives off a minus voltage. This minus voltage determines that the motor 8 likewise reverses its direction of rotation. The speed of the motor 8 is now dependent on the magnitude of the minus voltage produced by device 6.

When the control carriage 7 moves too slowly (see FIG. 4a left-hand lower part), the contact 3–4 of limit switch 3.1 is closed. This contact gives off a minus voltage, for instance −5 volts, which is added to the minus voltage of the velocity measuring device, for instance −30 volts+5 volts=−35 volts.

The motor 8 thus immediately accelerates.

If in spite of the correction of the additional voltages the limit switches 3.1 and 3.2 of the control carriage would approach the templet table too closely or move away therefrom to an undesired extent, the contacts 1–2 of one of the limit switches 3.1 or 3.2 would be closed because the actuating lever would move too far toward one side whereby the admissible machining tolerance, for instance ±0.2 mm., would be exceeded.

The milling and thereby also the control carriage by corresponding relays, energized via wires 240, 241, 242, would be shifted for return to the basic position, and the machine would be stopped and the alarm signal would be given and the control would then have be checked.

In FIG. 4b the limit switches are shown when the pushrod 33 is precisely in its intermediate position. The millimeters indicated in FIG. 4b between the contact bridges and the fixed contacts represent the example for the adjustment of these limit switches. The individual contacts can be adjusted accordingly by screws 35, 36.

When turning off the fast return movement by the limit switch 11, the return relay will start receiving voltage and through a signalling lamp will indicate the source of the disturbance. It has already been mentioned that during the recessing operation, the control carriage 7 will through limit switch 10.1 be shifted from fast movement to feed $v_1$ and by limit switch 10.2 will be shifted to a feed speed $v_2$. If now at the end of the advancing movement, the push rod 33 of the feeler is actuated, first contact 3, 4 of switch 3.0 is shifted which through a corresponding potentiometer will now shift the speed to constant creeping movement. The stroke of the constant creeping movement should not exceed 1 to 2 millimeters. It is adjustable by a set screw 37 at the rear end of the limit switch. The speed should not exceed 10 millimeters per minute. When the contact 1, 2 of the limit switch 3.1 opens, the feed is turned off and the advance is completed and, more specifically, with a tolerance which is less than ±0.01 mm. This position is the control 0 point. In this position, the limit switches 3.1 and 3.2 therebelow are adjusted to center (FIG. 4b).

The control also includes the possibility automatically to turn the work piece to a new angular position. In such an instance, by means of clutch 21, which forms a part of the building unit B, the control members 13 to 18 are disengaged. The disengaged parts thus remain in the basic or starting position when the work piece spindle motor 16 through the transmission in fast movement drives the work piece spindle 4. To the work piece spindle drive there is connected a cam drum 22 which through limit switches 22.0 to 22.4 will when the provided switch angle is obtained again stop the partial drive.

Figure 7:
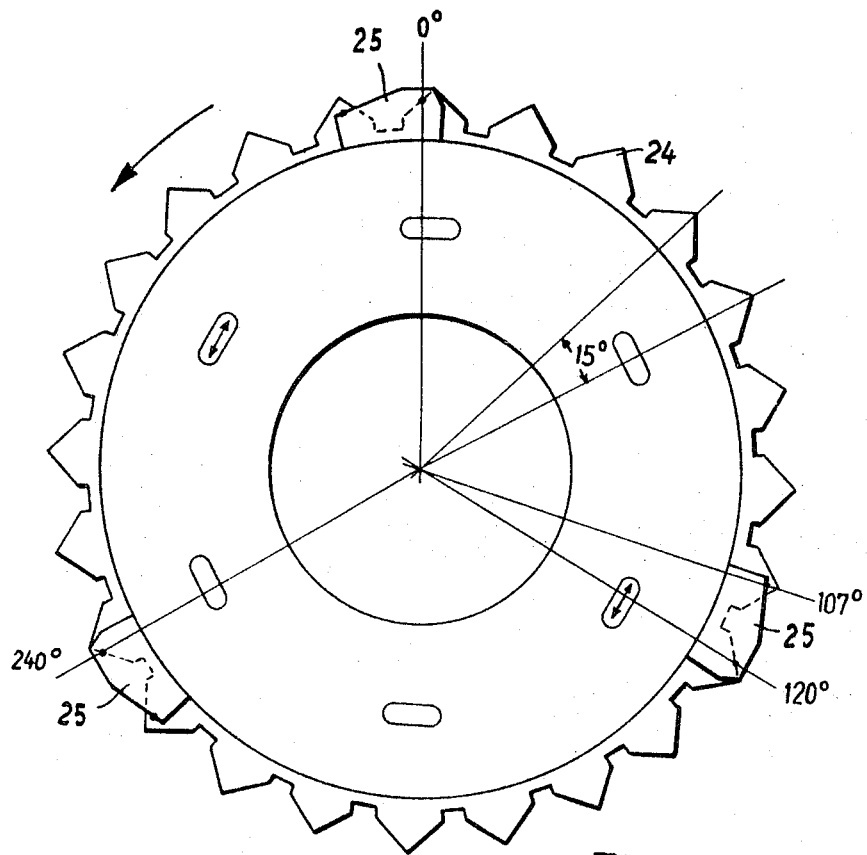
FIG. 7 shows the design of the cam on the control device for the work piece receiving means.

By means of limit switches 22.1 to 22.4, the fast traverse movement is turned off and the creeping movement (low speed) is turned on through a corresponding creep stage potentiometer. The precise stop is always effected by means of limit switch 22.0. To this end, the invention provides a precisely ground cam star 24 shown in FIG. 7 and provided with a pitch of for instance of 15° by which all required position angles can be divided. It is thus necessary only once prior to the assembly of the limit switch 22.0 to precisely adjust in respect thereto the cam star 24, whereas cams 25 for limit switch 22.1 to 22.4 which turn off the fast traverse movement, for instance at 110°, and which add the creep stage, said cams 25 can be adjusted with coarse precision. The stop at 120° by the cam star 24 has to be adjusted only once by adjusting the cam star 24. In this way, also all other angles which are pre-selected by cam 25 are determined with regard to the precise point when they are turned off because in view of the creep stage, from the moment of turning off the fast traverse movement by cams 25, to the stop by cams 24, the tolerance will remain within the desired precision. This considerably sustains the adjusting time for other adjusting angles which will become necessary for another work piece.

It is, of course, to be understood that the present invention is, by no means, limited to the particular arrangement shown in the drawings but also comprises any modifications within the scope of the appended claims. Thus, instead of the limit switch group 22, it is also possible by means of an impulse emitter of the digital construction to shift to a digital counting mechanism of any standard design. In this instance, in the counting mechanism the various angles can be manually pre-adjusted at one or more decade circuits. With digital control, the pre-adjustment may also be effected manually by means of a perforated band.

What is claimed is:

1. A copying machine comprising; a workpiece spindle, a template spindle, a first drive means driving said workpiece spindle and template spindle in unison, a template follower carriage having a follower following a template on said template spindle, a tool carriage, a control carriage, second drive means driving said tool carriage and control carriage in unison, said tool carriage being adapted for carrying tool means for forming a workpiece on said workpiece spindle, said control carriage being arranged to follow said follower carriage, speed measuring means driven by said follower carriage and connected in controlling relation to said second drive means to control the direction and speed thereof, and cooperating elements of control means on said follower carriage and said control carriage operable in response to relative moveemnt therebetween to adjust the speed of said second driving means to maintain said control carriage in a predetermined position relative to said follower carriage.

2. A copying machine according to claim 1 in which said template follower carriage is continuously biased toward a template on said template spindle and said second drive means is a reversible variable speed motor.

3. A copying machine according to claim 2 in which said speed measuring device has a drive pinion, and a rack meshing with said pinion and connected to said template carriage to move therewith.

4. A copying machine according to claim 3 in which said speed measuring device comprises a pair of generators, a synchronous motor driving said generators, a differential between said synchronous motor and one of said generators having one element connected to said pinion so rotation of the pinion will modify the speed of said one generator, and means for developing a signal from the combined outputs of said generators.

5. A copying machine according to claim 3 in which said cooperating elements of control means on said follower carriage and control carriage include switch means on said follower carriage and adjustable abutment means on said control carriage cooperating with said switch means.

6. A copying machine according to claim 5 in which said switch means includes first switch means operable upon actuation of said abutment means to reduce the speed of said second drive means from fast traverse speed to creeping speed.

7. A copying machine according to claim 6 which includes means for preventing said control carriage from leaving a predetermined position relative to said follower carriage during rotation of said template spindle.

8. A copying machine according to claim 7 which includes an indicator between said follower carriage and said control carriage to indicate the relative position thereof.

9. A copying machine according to claim 5 in which said switch means include further switches sensitive to relative movement between said control carriage and said follower carriage following operation of said first switch means.

10. A copying machine according to claim 9 in which said further switch means provide for graduated signals depending on the amount of movement of said control carriage relative to said follower carriage.

11. A copying machine according to claim 9 which includes means for causing retraction of said tool carriage and control carriage in response to a predetermined movement of said control carriage relative to said follower carriage.

12. The method of operating a copying machine having a workpiece spindle and a template spindle driven in unison and a template follower carriage continuously following a template on said template spindle and having a tool carriage and a control carriage also driven in unison independently of said spindles which comprises; rapidly advancing said tool carriage toward said workpiece spindle while simultaneously advancing said control carriage toward said follower carriage, halting said rapid advance when said control carriage occupies a predetermined position relative to said follower carriage, thereafter controlling the speed and direction of movement of said control carriage in conformity with the speed and direction of movement of said follower carriage, and effecting fine adjustment of the speed of movement of said control carriage in conformity with relative movement between the control carriage and follower carriage to maintain a fixed relation between said control carriage and said template spindle and, therefore, between said tool carriage and said workpiece spindle during a copying operation.

13. A copying machine according to claim 12 in which a limit switch is provided to limit the retracting movement of said tool carriage and control carriage and a cam is provided on one of said control carriages and a said tool carriage to operate said limit switch.

14. A copying machine according to claim 12 in which a step down transmission is interposed between said second drive means and said control carriage to reduce the speed of the control carriage and thereby permit reduction of the dimensions of said template.

15. A copying machine according to claim 14 in which control means are provided on the control carriage for controlling the rapid advance and retracting movements of the tool carriage.

16. A copying machine according to claim 14 in which said control carriage and the follower carriage and the template spindle together with said second drive means form a single structural unit.

17. A copying machine according to claim 16 in which said first drive means is also incorporated in said structural unit.

18. A copying machine according to claim 17 in which said template spindle is fixed to a shaft which is coupled directly to said workpiece spindle.

19. A copying machine according to claim 18 which includes a speed cam on said template spindle shaft, and speed control means connected to said first drive means and under the control of said speed cam.

20. A copying machine according to claim 19 in which said speed control means includes an adjustment for shifting the controlled speed of said first drive means a predetermined fraction in either direction over the entire range thereof.

21. A copying machine according to claim 20 in which said speed control means is in the form of a rotary transformer.

22. A copying machine according to claim 19 which includes a control cam on said spindle shaft, and a control limit switch operated by said control cam for detecting when the workpiece spindle is in a predetermined rotated position.

23. A copying machine according to claim 22 in which said control limit switch is operable when actuated for turning off the copying operation and causing said tool carriage to retract to its starting position.

24. A copying machine according to claim 22 which includes a clutch interposed between said template spindle and said workpiece spindle to permit said workpiece spindle to be indexed to a new position relative to said template spindle.

25. A copying machine according to claim 24 which includes a workpiece spindle shaft, a cam support on said workpiece spindle shaft, adjustable cams on said cam support, and limit switches under the control of said adjustable cams.

26. A copying machine according to claim 25 in which said cam support is an angularly divided drum on which said adjustable cams are mounted.

27. A copying machine according to claim 26 in which said drum is in the form of a ground star cam with the points thereof distributed uniformly about the axis of said workpiece spindle shaft.

References Cited

UNITED STATES PATENTS

| | | | |
|---|---|---|---|
| 2,013,676 | 9/1935 | Stewart | 90—13.4 |
| 2,415,062 | 1/1947 | Green | 51—101 |
| 2,872,852 | 2/1959 | Meyer | 90—13.4 |
| 2,926,471 | 3/1960 | Bricker. | |
| 3,122,864 | 3/1964 | Langel | 51—101 |
| 3,182,559 | 5/1965 | Schnitzer | 90—13.4 |
| 3,344,559 | 10/1967 | Seiuemon Inaba et al. | |
| | | | 90—3.99 X |

ANDREW R. JUHASZ, Primary Examiner

G. WEIDENFELD, Assistant Examiner